United States Patent [19]

Newcomb, Jr. et al.

[11] 3,780,966

[45] Dec. 25, 1973

[54] ATTITUDE SENSOR

[75] Inventors: Arthur L. Newcomb, Jr.; Aubrey G. Price, both of Seaford, Va.

[73] Assignee: The United States of America as represented by the Administrator of the National Aeronautics and Space Administration, Washington, D.C.

[22] Filed: Sept. 14, 1972

[21] Appl. No.: 289,049

[52] U.S. Cl.......... 244/1 SA, 102/70.2 R, 244/3.16, 250/203 R, 250/237 R
[51] Int. Cl................................................ B64g 1/10
[58] Field of Search................ 244/1 SS, 1 SA, 321, 244/3.16; 250/203 R, 228, 237 R; 318/313, 480, 580

[56] References Cited
UNITED STATES PATENTS
3,381,569  5/1968  Hatcher........................ 244/1 SA X
3,435,246  3/1969  Webb.......................... 250/203 R X
3,268,185  8/1966  Eckermann.................... 250/203 R
3,226,062  12/1965  Davis............................. 244/1 SA FOREIGN PATENTS OR APPLICATIONS
251,415  5/1960  U.S.S.R........................... 250/203 R

*Primary Examiner*—Trygve M. Blix
*Assistant Examiner*—Barry L. Kelmachter
*Attorney*—Howard J. Osborne et al.

[57] ABSTRACT

The invention consists essentially of two light sensors on a spacecraft that are mounted beneath a baffle which divides the light from a light source such as the sun or a star. The divided light reflects off of two reflective surfaces onto the two light sensors. When the spacecraft assumes its normal attitude the baffle divides the light from the light source into two equal parts cuasing the two light sensors to produce equal outputs. An electrical circuit containing the two sensors produces a zero voltage output when the outputs of the two light sensors are equal thereby indicating that the spacecraft is in its normal attitude relative to the light source. While the spacecraft is not in its normal attitude relative to the light source the two light sensors produce unequal outputs causing the electrical circuit to produce an output voltage. The amplitude and polarity of this output voltage are indicative of the attitude of the spacecraft and can be applied to the controls of the spacecraft to return it to its normal attitude.

5 Claims, 6 Drawing Figures

PATENTED DEC 25 1973　　　　　　　　　　　　　　　3,780,966

3,780,966

ATTITUDE SENSOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Attitude control systems are needed by many spacecraft to maintain a fixed attitude of the spacecraft with respect to the sun or a star. Photo-voltaic light sensors (solar cells) and photo-resistive elements are presently being used in many of these control systems. Most of these sensors either have low sensitivity or fairly high thermal drift characteristics coupled with sensitivity to infrared, depending on the substance of the cells used.

It is the purpose of this invention to provide a low cost attitude sensor for sensing the attitude of a spacecraft relative to the sun or a star which has excellent sensitivity and resolution over small angular deflections and which has excellent stability over reasonable temperature variations due to the thermal proximity of the cells used.

SUMMARY OF THE INVENTION

The invention is a precise high resolution attitude sensor for sensing the attitude of a spacecraft relative to a light source such as a star or the sun. A housing, with an aperture in one of its ends, is attached to the spacecraft. At the other end and inside the housing are two reflective surfaces. A baffle is located inside the housing between the aperture and the two reflective surfaces for dividing the light that passes through the aperture. Two light sensors are placed inside the housing to intercept the light reflected by the two reflective surfaces. An electrical circuit including the two light sensors produces a signal indicative of the difference between the outputs of the two light sensors. While the spacecraft is in its normal attitude the baffle equally divides the light from the light source that passes through the aperture and the electrical circuit produces a zero signal. While the spacecraft is not in its normal attitude the baffle does not equally divide the light from the light source that passes through the aperture and the electrical circuit produces a non-zero signal. The amplitude of this signal is indicative of the difference in the spacecraft's attitude from its normal attitude and the polarity of the signal represents the direction of this difference.

In one embodiment of the invention the two reflective surfaces are two flat surfaces. In another embodiment the two reflective surfaces are two integrating spheres. In a further embodiment of the invention the sensor senses the attitude about two axes instead of one axis.

DETAILED DESCRIPTION OF THE INVENTION

Figure 1:
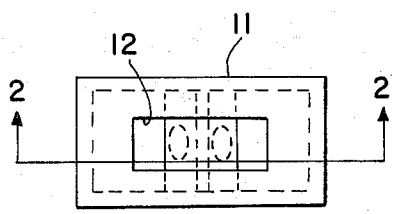
FIG. 1 is a top schematic view of the preferred embodiment of the invention.
Figure 2:
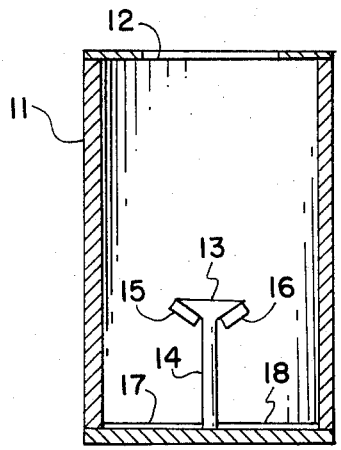
FIG. 2 is the 2—2 sectional schematic view of the embodiment of the invention in FIG. 1.

Turning now to the embodiment of the invention selected for illustration in FIGS. 1 and 2 of the drawing, the number 11 designated a housing that is attached to a spacecraft and that has a rectangular aperture 12 in its top. Located under aperture 12 inside housing 11 is a baffle 13 which is attached to housing 11 by any suitable means 14. Attached to the under side of baffle 13 are photo-resistive light sensors 15 and 16. Light sensors 15 and 16 can be cadmium sulfide cells. These light sensors are aligned such that their fields-of-view make small angles of approximately thirty degrees on opposite sides of the centerline of baffle 13. On the inside of housing 11 opposite aperture 12 are two flat diffuse (white) reflective surfaces 17 and 18. All other surfaces inside housing 11 are nonreflective black-coated. Light that passes through aperture 12 is reflected by reflective surfaces 17 and 18 onto light sensors 15 and 16, respectively. While the spacecraft maintains its normal attitude the light through the aperture from the light source is equally divided by baffle 13. This light is reflected by reflective surfaces 17 and 18 onto light sensors 15 and 16, respectively, causing them to have equal resistances in an electrical circuit. While the spacecraft is not in its normal attitude more light is reflected by one of the surfaces than the other thereby causing the two light sensors to have difference resistances.

Figure 3:
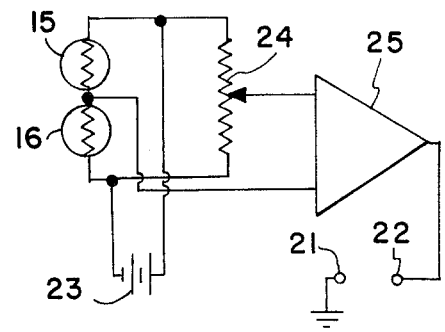
FIG. 3 is a schematic drawing of the electrical circuitry used in the invention.

The electrical circuit in FIG. 3 produces a voltage at its output terminals 21 and 22 which is indicative of the difference in resistance of light sensors 15 and 16. Light sensors 15 and 16 are connected in series across a voltage source 23 and a potentiometer 24. The junction of light sensors 15 and 16, and the slider of potentiometer 24 are connected to the inputs of a differential amplifier 25. The output of amplifier 25 is connected to output terminal 22 and output terminal 21 is connected to ground. With no light on sensors 15 and 16 the slider of potentiometer 24 is adjusted to give zero output voltage across terminals 21 and 22. Thereafter the voltate across terminals 21 and 22 is indicative of the difference in resistances of sensors 15 and 16.

In the operation of the embodiment of the invention shown in FIGS. 1, 2 and 3, with the spacecraft in its normal attitude, that is, with aperture 12 pointed in the direction of the light source, equal amounts of light are reflected by reflective surfaces 17 and 18 onto light sensors 15 and 16. Hence, the resistances of the two sensors are equal causing a zero voltage to be produced across output terminals 21 and 22. Whenever the attitude of the spacecraft changes, different amounts of light are reflected by surfaces 17 and 18 onto sensors 15 and 16. This causes the resistances of the two sensors to be unequal thereby causing a voltage to be produced across output terminals 21 and 22. The amplitude of this voltage indicates the amount of misalignment of aperture 12 with the light source (the difference between the spacecraft's attitude and its normal attitude) and the polarity of the voltage indicates the direction of the misalignment. This voltage can be used by the spacecraft attitude control to return the spacecraft to its normal attitude.

Figure 4:
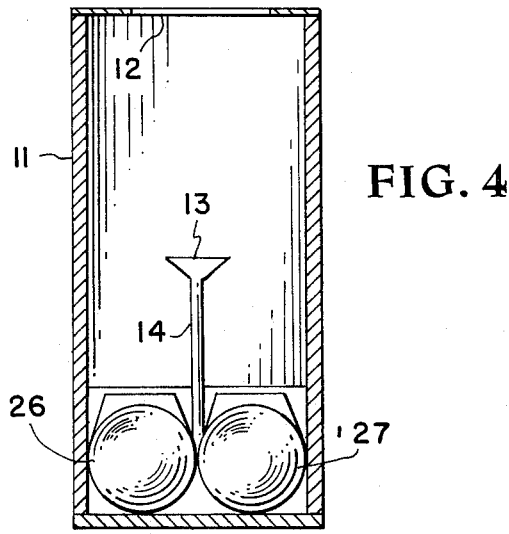
FIG. 4 is a schematic drawing of a second embodiment of the invention.
Figure 5:
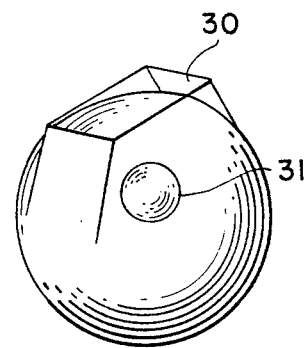
FIG. 5 is a schematic drawing of one of the two spherical reflective surfaces used in the second embodiment of the invention.

In another embodiment of the invention, for the purpose of light-gathering efficiency and linearity improvement, the reflective surfaces 17 and 18 in FIG. 1 are replaced by light-integrating spheres 26 and 27, respectively, as shown in FIG. 4. Each of the integrating spheres, as shown in FIG. 5, is made of optical plastic with its outside surface coated "white" except viewing window 30 and sensor window 31. The light from the light source passes through viewing window 30 and is reflected by the inside surface of the sphere onto the light sensor which is placed over sensor window 31.

Figure 6:
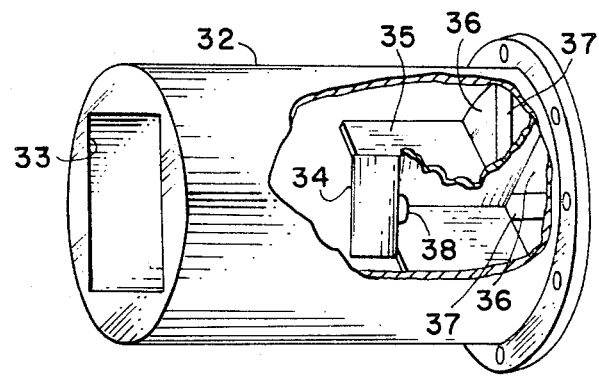
FIG. 6 is a cutaway schematic drawing of a two-axis version of the invention.

A two-axis version of the invention is shown in FIG. 6. A cylindrical housing 32 has a square aperture 33 in one of its ends. A baffle is located inside housing 32 near the end opposite aperture 33. A support means 35 supports baffle 34 and divides the inside surface of housing 32 opposite aperture 33 into four equal surfaces 36. Four diffuse reflective white strips 37 are on surfaces 36. All other intersurfaces are nonreflective black-coated. Four light sensors 38 are attached to the underside of baffle 34. In this embodiment of the invention two of the electrical circuits shown in FIG. 3 are required with opposite sensors 38 in each circuit.

The invention has several advantages over prior art attitude sensors. It has excellent stability over reasonable temperature variations due to the thermal proximity of the cells. It has excellent sensitivity and resolution over small angular deflections. Also, it is a low-cost device.

It is to be understood that the forms of the invention herewith shown and described are to be taken as preferred embodiments. Various changes may be made without departing from the spirit or scope of the invention as defined in the subjoined claims. For example, certain alternations may be made to vary sensitivity, signal-to-noise ratios (SNR), linear field-of-view (FOV) light-gathering efficiency, and environmental stability. The sensitivity, SNR and FOV are affected by varying aperture dimensions and the relative height of the baffle from the reflective surface with respect to the aperture height. Light filters may be used to reduce incident light where intense sources are used (i.e., when used as a solar sensor). Environmental stability may be raised to near-indestructible levels by casting the entire device in an optically suitable compound (clear resins of several types exist that would be adequate). Sensitivity may be adjusted by raising and lowering the inner baffle.

What is claimed as new and desired to be secured by Letters Patent of the United States is:

1. An attitude sensor on a spacecraft for sensing the attitude of the spacecraft about an axis relative to a light source such as a star or the sun comprising:
   housing means attached to said spacecraft with an aperture in one of its ends, the aperture being pointed in the direction of siad light source while the spacecraft is in its normal attitude;
   two reflective surfaces located inside said housing means at its other end and fixed relative to the housing means;
   a single baffle means located inside said housing means between said aperture and said two reflective surfaces for dividing into two parts the light that passes through said aperture from said light source such that one part of the light strikes one of the reflective surfaces and the other part of the light strikes the other reflective surface, said baffle means being positioned such that only while said spacecraft is in its normal attitude the baffle means divides the light from said light source into equal parts;
   two light sensor means for sensing the light reflected by said two reflective surfaces, respectively; and
   electrical circuit means including said two light sensor means for producing an electrical signal indicative of the difference between the outputs of said two light sensor means whereby the amplitude of said electrical signal is indicative of the difference between the attitude of the spacecraft and its normal attitude and the polarity of said electrical signal is indicative of the direction of the difference.

2. An attitude sensor according to claim 1 wherein said two reflective surfaces are two flat surfaces.

3. An attitude sensor according to claim 1 wherein said two reflective surfaces are two integrating spheres.

4. An attitude sensor according to claim 1 wherein said two light sensor means are two photo-resistive light sensors.

5. An attitude sensor according to claim 1 wherein said two light sensor means are attached to the side of said baffle away from said aperture.

* * * * *